(12) United States Patent
Rodgers

(10) Patent No.: US 11,247,731 B2
(45) Date of Patent: Feb. 15, 2022

(54) MOBILE WATER DIVERTER

(71) Applicant: WAV Industries, Inc., Nashville, TN (US)

(72) Inventor: Michael D. Rodgers, Nashville, TN (US)

(*) Notice: Subject to any disclaimer, the term of this patent is extended or adjusted under 35 U.S.C. 154(b) by 27 days.

(21) Appl. No.: 16/869,247

(22) Filed: May 7, 2020

(65) Prior Publication Data

US 2020/0353992 A1 Nov. 12, 2020

Related U.S. Application Data

(60) Provisional application No. 62/844,585, filed on May 7, 2019.

(51) Int. Cl.
*B62D 25/07* (2006.01)

(52) U.S. Cl.
CPC .................................. *B62D 25/07* (2013.01)

(58) Field of Classification Search
CPC ............................... B62D 25/07; B60R 13/07
USPC ......................................................... 296/213
See application file for complete search history.

(56) References Cited

U.S. PATENT DOCUMENTS

| | | | | |
|---|---|---|---|---|
| 2,193,298 A * | 3/1940 | Schottenberg | ....... | B23K 11/002 29/897.312 |
| 3,050,335 A * | 8/1962 | Schubach | ............... | B62D 33/04 296/213 |
| 3,892,439 A * | 7/1975 | Gotz | ........................ | B60R 13/07 296/213 |
| 4,433,868 A * | 2/1984 | Hochwitz | ............... | B62D 51/00 180/89.12 |
| 5,178,435 A * | 1/1993 | Anderson | ............... | B60R 13/07 296/208 |
| 5,675,940 A * | 10/1997 | Bahar | .................... | E04D 13/031 52/200 |
| 5,788,323 A * | 8/1998 | Barringer | .................... | B60J 1/20 296/154 |
| 7,172,422 B1 * | 2/2007 | Essiger | ............... | A61B 17/8038 433/172 |
| 8,656,656 B2 * | 2/2014 | Grunewald | .......... | B65G 69/008 52/173.2 |
| 8,668,255 B1 * | 3/2014 | Randleman | ............ | B62D 33/06 296/213 |
| 2005/0040669 A1 * | 2/2005 | Wood | .................... | B62D 35/007 296/180.1 |
| 2005/0166488 A1 * | 8/2005 | Borgerding | .......... | B65G 69/008 52/173.2 |

(Continued)

FOREIGN PATENT DOCUMENTS

| KR | 200319746 Y1 * | 7/2003 |
|---|---|---|
| KR | 20160132340 A * | 11/2016 |

*Primary Examiner* — D Glenn Dayoan
*Assistant Examiner* — Kevin P Weldon
(74) *Attorney, Agent, or Firm* — Robinson IP Law, PLLC

(57) ABSTRACT

A diverter for directing water runoff along a roof includes: a first arm having an upright portion and a base portion, the upright portion is substantially perpendicular to the base portion; a second arm having an upright portion and a base portion, the upright portion being substantially perpendicular to the base portion. The first arm is joined to the second arm at a middle of the diverter such that an angle between the first arm and the second arm is from about 90 degrees to about 160 degrees. The diverter is mountable on the roof such that distal ends of the first arm and the second arm are proximate to side edges of the roof.

13 Claims, 5 Drawing Sheets

(56) References Cited

U.S. PATENT DOCUMENTS

| | | | |
|---|---|---|---|
| 2007/0068092 A1* | 3/2007 | Fraser, Jr. | E04D 13/0481 52/97 |
| 2007/0235590 A1* | 10/2007 | Kokoshkin | B62D 35/001 244/130 |
| 2015/0069788 A1* | 3/2015 | Bertholee | B60J 7/22 296/213 |
| 2018/0195289 A1* | 7/2018 | McIntosh | E04D 3/3606 |

* cited by examiner

MOBILE WATER DIVERTER

CROSS-REFERENCE TO RELATED APPLICATION

This application claims priority to and is a non-provisional of U.S. Provisional Patent Application Ser. No. 62/844,585 filed on May 7, 2019, the contents of which are incorporated herein by reference in its entirety.

FIELD

This disclosure relates to the field of trucking and transportation. More particularly, this disclosure relates to a device for improving airflow over a portion of a truck and for diverting water away from a loading/unloading area of a truck.

BACKGROUND

When a truck, such as a semi-truck or delivery truck, pulls into a dock while it is raining, water may run down a length of a roof of the truck and towards an area of the truck where loading/unloading is taking place, such as at the back of the truck. Items being loaded/unloaded from the truck as well as individuals load and unloading items become soaked. This is particularly a problem when an area near a loading dock is sloped such that rainwater runoff moves towards a back of the truck or its trailer.

Attempts have been made to reduce runoff of rainwater from a loading/unloading area of a truck. For example, most attempts involve modification of a loading dock, such as by changing or adding a roof structure of a building at the loading dock to extend at least partially over a truck. However, given the length of trucks and their trailers, it is difficult to cover an entire length of the truck or its trailer, thereby allowing rainwater to continue to runoff along a length of the truck. Modifications to a loading dock and surrounding structures is expensive and time consuming.

What is needed, therefore, is a device for preventing runoff of water from a truck onto a loading/unloading area behind the truck that also improves aerodynamic efficiency of the truck and/or its trailer.

SUMMARY

The above and other needs are met by a device for preventing runoff of water from a truck onto a loading/unloading area behind the truck that also improves aerodynamic efficiency of the truck and/or its trailer. In a first aspect, a diverter for directing water runoff along a roof includes: a first arm having an upright portion and a base portion, the upright portion being substantially perpendicular to the base portion; a second arm having an upright portion and a base portion, the upright portion being substantially perpendicular to the base portion. The first arm is joined to the second arm at a middle of the diverter such that an angle between the first arm and the second arm is from about 90 degrees to about 160 degrees. The diverter is mountable on the roof such that distal ends of the first arm and the second arm are proximate to side edges of the roof.

In one embodiment, the upright portion of the first arm and the upright portion of the second arm are sloped such that an angle between the upright portion of the first arm and the second arm is less than 90 degrees relative to the base portion of the first arm and the second arm.

In another embodiment, the diverter further includes one or more apertures formed through the base portion of the first arm and the base portion of the second arm for receiving one or more fasteners to secure the diverter to the roof.

In yet another embodiment, a thickness of the upright portion of the first arm and a thickness of the upright portion of the second arm is tapered towards upper ends of the upright portion of the first arm and the upright portion of the second arm.

In a second aspect, a method of manufacturing a water diverter for directing water runoff along a roof includes: providing an elongate L-shaped piece; forming a notch in a base portion at a center of the elongate piece; and folding the elongate L-shaped piece at the notch such that a first side of the water diverter is formed at an angle of from about 90 degrees to about 160 degrees relative to a second side of the water diverter.

BRIEF DESCRIPTION OF THE DRAWINGS

Further features, aspects, and advantages of the present disclosure will become better understood by reference to the following detailed description, appended claims, and accompanying figures, wherein elements are not to scale so as to more clearly show the details, wherein like reference numbers indicate like elements throughout the several views, and wherein:

DETAILED DESCRIPTION

Various terms used herein are intended to have particular meanings. Some of these terms are defined below for the purpose of clarity. The definitions given below are meant to cover all forms of the words being defined (e.g., singular, plural, present tense, past tense). If the definition of any term below diverges from the commonly understood and/or dictionary definition of such term, the definitions below control.

Figure 1:
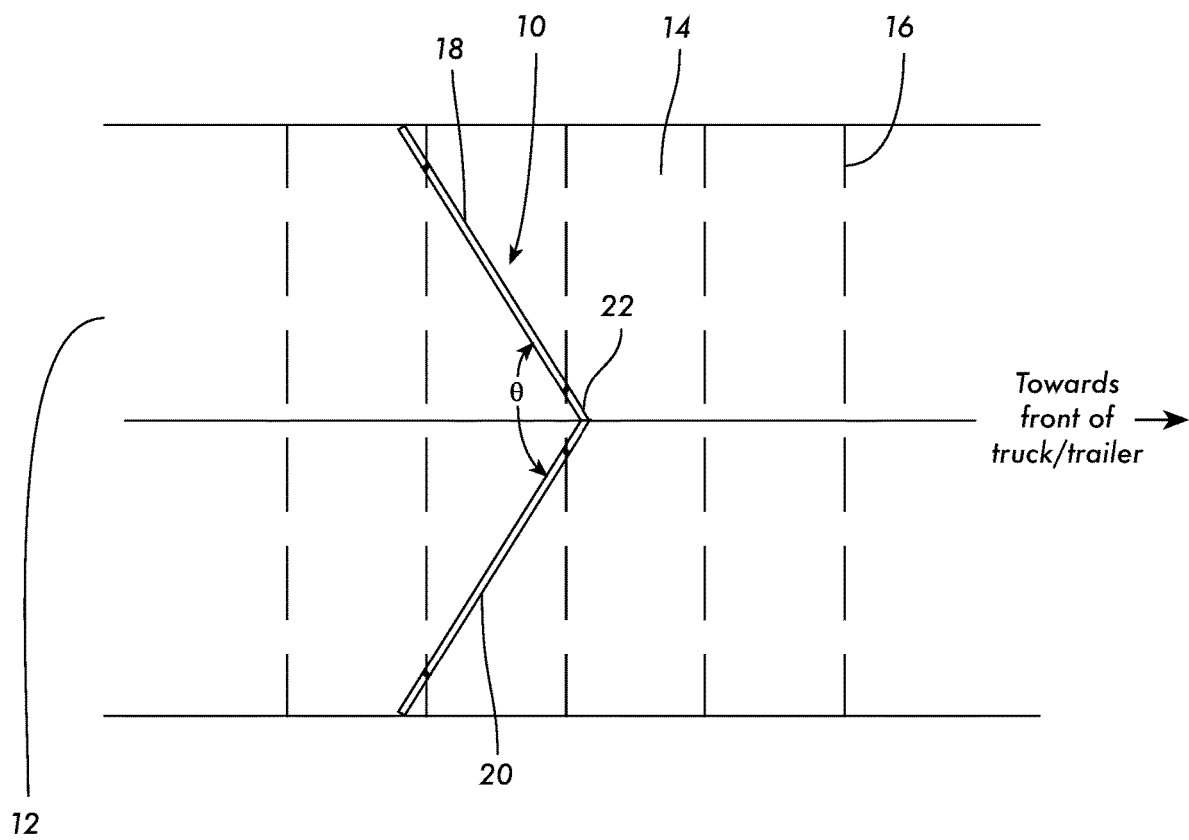
FIG. 1 shows a schematic view of a diverter device installed on a roof according to one embodiment of the present disclosure.

FIG. 1 shows a basic embodiment of a diverter 10 for preventing water runoff, such as rain runoff, from flowing towards a back of a truck and into a loading/unloading area 12 of the truck, preferably towards a back of a truck or its trailer. The diverter 10 advantageously prevents water runoff from flowing towards the loading/unloading area 12 of the truck or its trailer. Further, the diverter 10 may be located along a roof of the truck or its trailer such that the diverter 10 interacts with an airflow over the truck/trailer, such as to improve fuel efficiency of the truck.

Embodiments herein refer to the diverter 10 being installed on a roof or top of a truck or its trailer. For example, embodiments of the diverter 10 may be suitable for installation on a roof of a trailer towable by a semi-tractor. Other embodiments may be installed on a roof of a truck, such as when the truck is a box delivery or other similar truck.

Reference herein is made primarily to use of the diverter 10 preventing water runoff from flowing to a loading or unloading area of a truck located at a back of a truck. For example, many trucks include a roll-up door or hinged doors opening at a back of the truck. However, it is also understood that embodiments of the diverter 10 described herein may be used to prevent water runoff from flowing over other portions of a truck/trailer, such as a side door of the truck/trailer.

With further reference to FIG. 1, the diverter 10 is preferably installed on a roof 14 of a truck or trailer. The diverter 10 is preferably installed on the roof 14 such that the diverter 10 is secured to the roof 14. For example, the diverter 10 may be secured to the roof 14 using one or more fasteners inserted through at least a portion of the diverter 10 and into one or more roof ribs 16 supporting the roof 14. It is also understood that the diverter 10 may be installed on the roof 14 of a truck or trailer, such as with an adhesive.

Figure 2:
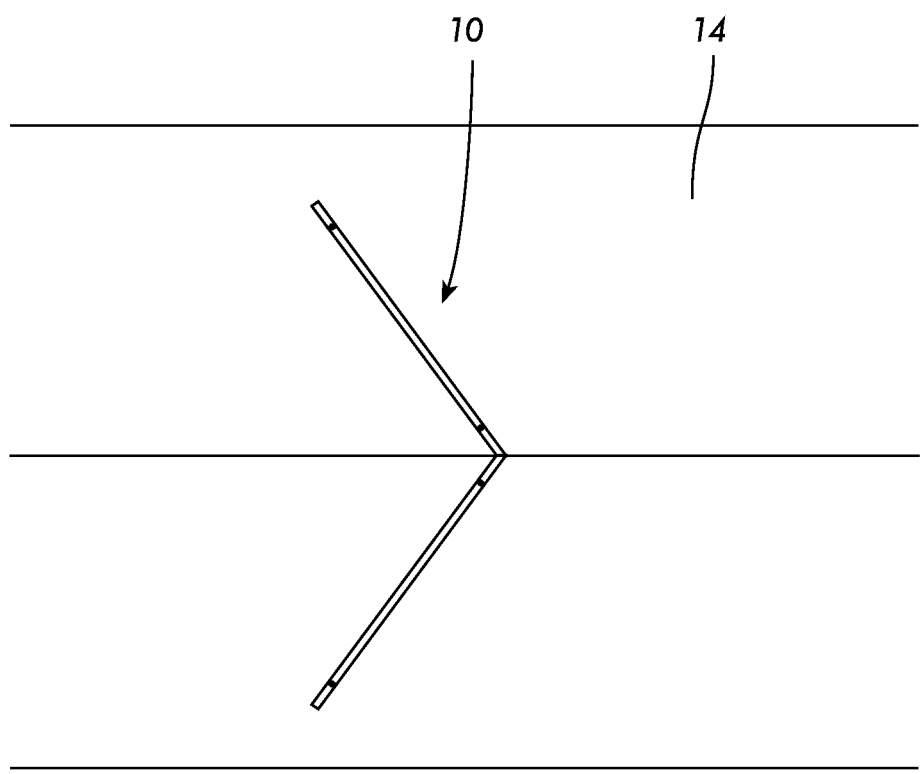
FIG. 2 shows a schematic view of a diverter device installed on a roof according to one embodiment of the present disclosure.

The diverter 10 includes a first arm 18 and a second arm 20. The first arm 18 and the second arm 20 are jointed at a middle 22 of the diverter 10 and angle outwardly and rearwardly from the middle of the diverter 22 at a center of the roof 14 towards opposing sides of the roof. An angle θ of the first arm 18 relative to the second arm 20 may vary depending on a factors such as a width of the roof 14, whether the diverter 10 extends across a full width of the roof 14, and other desired characteristics of the diverter 10. For example, and as shown in FIG. 2, the diverter 10 may extend at least partially towards side edges of the roof 14.

In one embodiment, the angle of the first arm 18 relative to the second arm 20 when installed on the roof 14 is from about 90° to about 160°. In one embodiment, such as when the diverter 10 is installed on top of a tractor trailer having a typical width of approximately 102 inches, the angle of the first arm 18 relative to the second arm 20 of the diverter 10 is approximately 116°. In this example, the first arm 18 and the second arm 20 have lengths of approximately 60 inches. In another example, as shown in FIG. 2, the angle of the first arm 18 relative to the second arm 20 is approximately 107°. The first arm 18 and the second arm 20 may have lengths of approximately 51 inches such that ends of the first arm 18 and the second arm 20 are located approximately 10 inches from side edges of the roof 14 on a 102" wide trailer. While the above embodiments provide exemplary lengths and angles of components of the diverter 10, it is also understood that those dimensions may vary, such as depending on a vehicle or trailer on which the diverter 10 is installed or a desired orientation of the diverter 10.

Figure 3:
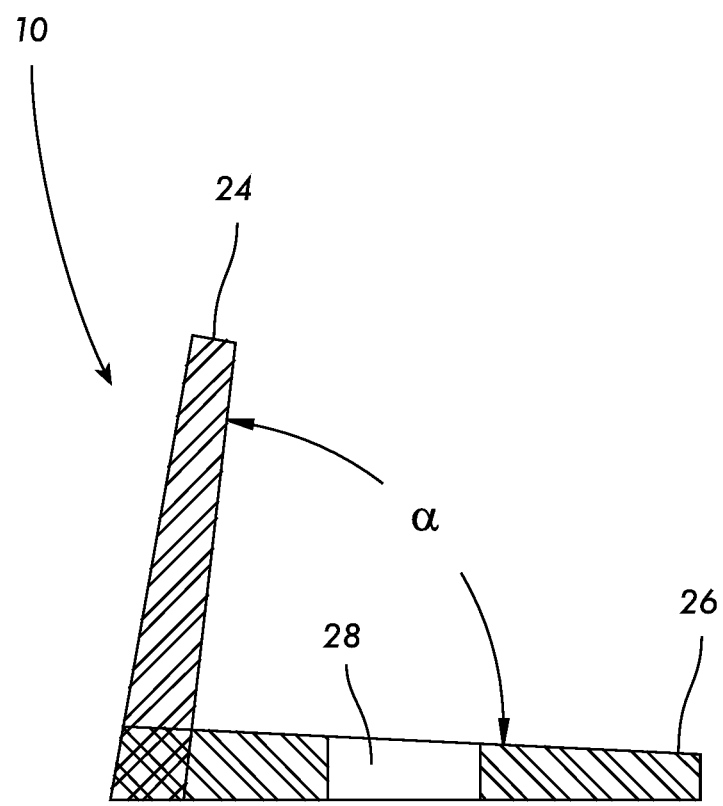
FIG. 3 shows a cross-sectional side view of a portion of a diverter device according to one embodiment of the present disclosure.

FIG. 3 shows a cross-sectional view along a length of the diverter 10, such as along a length of the first arm 18 and the second arm 20. A cross-section of the first arm 18 and the second arm 20 is substantially L-shaped as shown in FIG. 3. The diverter includes a substantially upright portion 24 and a base portion 26. In one embodiment, an angle α of the upright portion 24 relative to the base portion 26 is from about 60° to about 90°. In one example, the angle between the upright portion 24 and the base portion 26 is approximately 86° such that a forward-facing surface of the upright portion 24 is at least partially inclined relative to vertical. The base portion 26 may include one or more apertures 28 formed therethrough for receiving fasteners to secure the diverter to the roof 14 as described herein.

As shown in FIG. 3, in one embodiment a thickness of the upright portion 24 and the base portion 26 is such that one or both of the upright portion 24 and the base portion 26 are tapered. For example, a thickness of the upright portion 24 and the base portion 26 may be from about 0.05" to about 0.2". In another example, a thickness of the upright portion 24 and the base portion tapers from a thickest portion at a corner where the upright portion 24 and base portion 26 are joined to a thinnest portion at ends of the upright portion 24 and the base portion 26.

Figure 4:
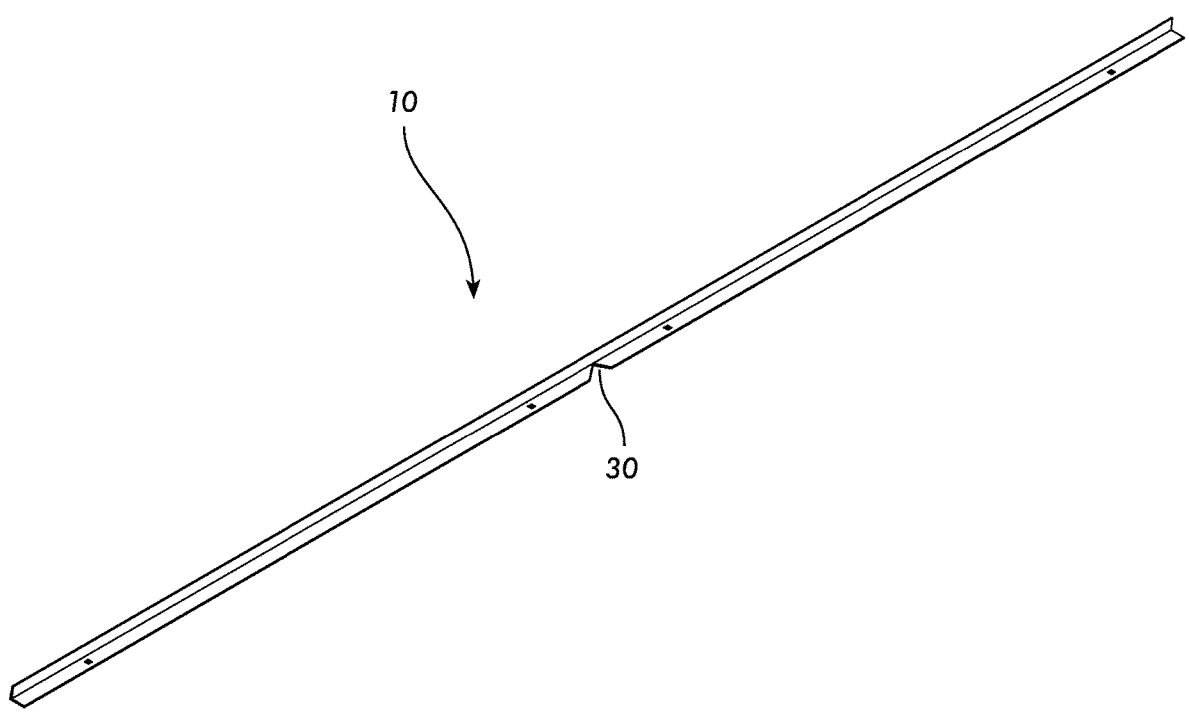
FIG. 4 shows a perspective view of an elongate piece formed into a diverter device according to one embodiment of the present disclosure.

Referring now to FIG. 4, the diverter 10 is preferably formed of an elongate angled piece. The diverter 10 may be formed of a single elongate piece having a desired L-shaped cross-sectional area as described above. A notch 30 is formed at a middle of the elongate angled piece to allow the elongate angled piece to fold or bend at the middle of the elongated angled piece at the notch 30 to a desired angle. For example, the notch 30 may be formed at an angle of from about 20° to about 60°, and preferably to about 40°.

The diverter 10 is preferably formed of an elongate angled piece and may be shipped or otherwise transported prior to bending the elongate angled piece as shown in FIG. 4. For example, when shaped as shown in FIG. 4, multiple of the diverters 10 may be stacked or otherwise packaged for transportation. During installation, the diverter 10 may be bent or folded at a middle of the diverter 10, such as at the notch 30. The diverter 10 is bent to a desired angle depending on where the diverter is installed, such as a width of a surface on which the diverter 10 is installed.

Figure 5A:
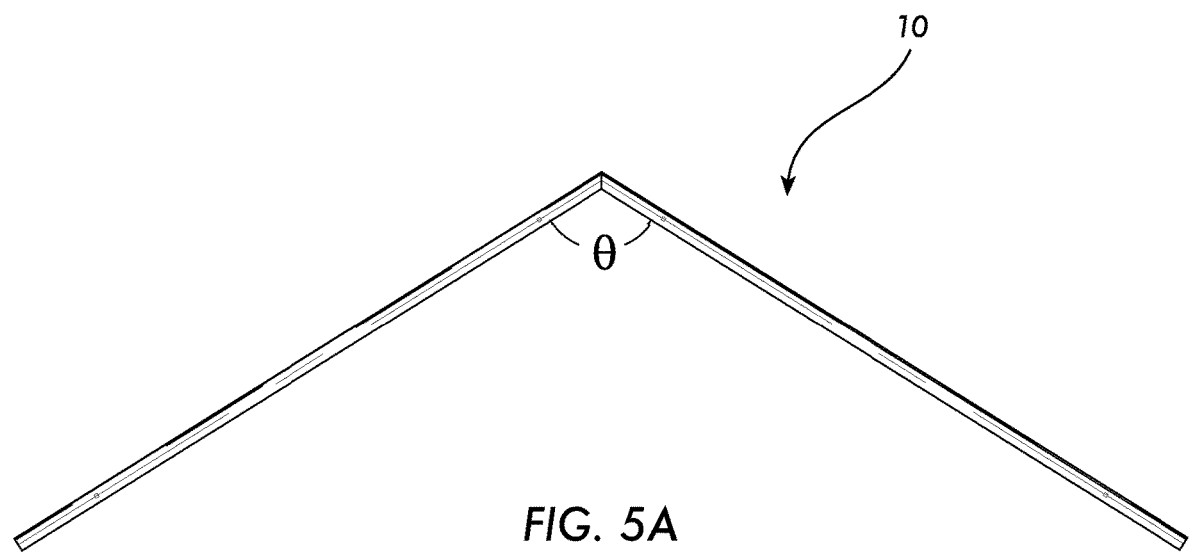
FIGS. 5A and 5B show a diverter formed of a single piece according to one embodiment of the present disclosure.
Figure 5B:
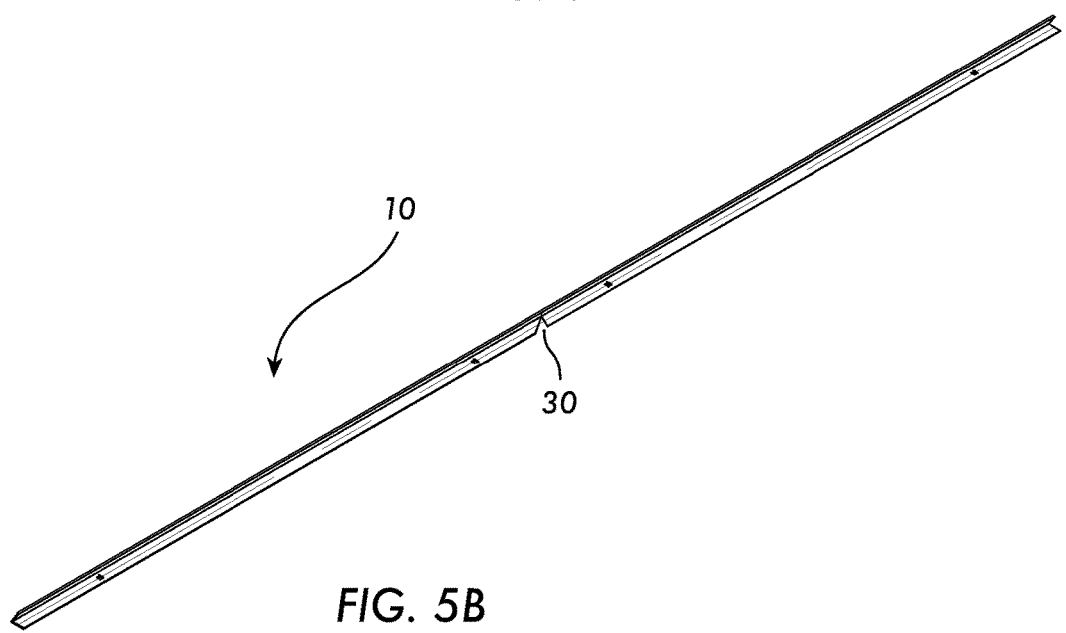

Referring to FIGS. 5A and 5B, in one embodiment the diverter 10 is formed of an elongate member having the notch 30 formed towards a middle of the elongate member. The notch 30 may be asymmetrical such at least one side of the notch is substantially perpendicular to an edge of the diverter 10 while another side is angled relatively to the edge of the diverter 10.

The diverter 10 is located on the roof 14, preferably of a semi-truck or delivery truck, and secured to the roof as shown in FIG. 1. The diverter 10 may be placed on the roof 14 such that the one or more apertures 28 are aligned with the one or more roof ribs 16 such that one or more fasteners secure the diverter 10 to the roof 14 at the one or more roof ribs 16. In another embodiment, the diverter 10 may be secured to the roof 14 with an adhesive. A base layer may be included between the base portion 26 and an upper surface of the roof 14 to further create a seal between the diverter 10 and the roof 14 and thereby prevent water from flowing past the diverter 10.

Embodiments of the diverter 10 disclosed herein advantageously prevent water from flowing along the roof 14 towards a loading/unloading area. For example, water flowing along the roof 14 is directed towards sides of the roof 14. The diverter 10 is preferably located towards a back of the roof 14 such that the diverter 10 is proximate to the loading/unloading area 12. The diverter 10 further advantageously interacts with a flow of air along the roof 14 when a truck and/or its trailer are in motion. For example, when located towards a rear of the truck and/or trailer, the diverter 10 may interact with an airflow along the roof 14 such as by enhancing or creating a vortex behind the truck and/or trailer, thereby resulting in improved fuel efficiency. Further advantages include re-directing water run-off and airflow along the roof 14 while in motion to increase visibility for following vehicles.

The foregoing description of preferred embodiments of the present disclosure has been presented for purposes of illustration and description. The described preferred embodiments are not intended to be exhaustive or to limit the scope of the disclosure to the precise form(s) disclosed. Obvious modifications or variations are possible in light of the above teachings. The embodiments are chosen and described in an effort to provide the best illustrations of the principles of the disclosure and its practical application, and to thereby enable one of ordinary skill in the art to utilize the concepts revealed in the disclosure in various embodiments and with various modifications as are suited to the particular use contemplated. All such modifications and variations are within the scope of the disclosure as determined by the appended claims when interpreted in accordance with the breadth to which they are fairly, legally, and equitably entitled.

What is claimed is:

1. A diverter for directing water runoff along a roof of one of a truck and trailer having a loading and unloading area, the diverter comprising:
   a first arm having an upright portion and a base portion, wherein the upright portion is substantially perpendicular to the base portion;
   a second arm having an upright portion and a base portion, wherein the upright portion is substantially perpendicular to the base;
   wherein the first arm is joined to the second arm at a middle of the diverter such that an angle between the first arm and the second arm is from about 90 degrees to about 160 degrees such that ends of the first arm and the second arm sweep towards a rear of one of the truck and trailer; and
   wherein the diverter is mountable on the roof of one of the truck and trailer such that distal ends of the first arm and the second arm extend to side edges of the roof of one of the truck and trailer such that water flowing along the roof is directed towards side edges of one of the truck and trailer along the first arm and the second arm and away from the loading unloading area and;
   wherein the diverter is located along the roof of one of the truck and trailer such that the diverter interacts with an air flow along the roof of one of the truck and trailer to enhance air flow over one of the truck and trailer.

2. The diverter for directing water runoff along a roof of one of a truck and trailer having a loading and unloading area of claim 1, wherein the upright portion of the first arm and the upright portion of the second arm are sloped such that an angle between the upright portion of the first arm and the second arm is less than 90 degrees relative to the base portion of the first arm and the second arm.

3. The diverter for directing water runoff along a roof of one of a truck and trailer having a loading and unloading area of claim 1, further comprising one or more apertures formed through the base portion of the first arm and the base portion of the second arm for receiving one or more fasteners to secure the diverter to the roof.

4. The diverter for directing water runoff along a roof of one of a truck and trailer having a loading and unloading area of claim 1, wherein a thickness of the upright portion of the first arm and a thickness of the upright portion of the second arm is tapered towards upper ends of the upright portion of the first arm and the upright portion of the second arm.

5. The diverter for directing water runoff along a roof of one of a truck and trailer having a loading and unloading area of claim 1, wherein the first arm and the second arm are formed of a single elongate member folded at a center of the single elongate member.

6. The diverter for directing water runoff along a roof of one of a truck and trailer having a loading and unloading area of claim 5, the single elongate member further comprising a notch at the center of the single elongate member.

7. The diverter for directing water runoff along a roof of one of a truck and trailer having a loading and unloading area of claim 6, the notch having an angle of from about 20° to about 60°.

8. The diverter for directing water runoff along a roof of one of a truck and trailer having a loading and unloading area of claim 1, further comprising one or more apertures located through the base portion of the first arm and the base portion of the second arm for receiving at least one fastener therethrough.

9. The diverter for directing water runoff along a roof of one of a truck and trailer having a loading and unloading area of claim 8, wherein the one or more apertures are located on the first arm and the second arm such that the one or more apertures are aligned with ribs of the roof on which the diverter is installed.

10. A diverter for directing water runoff along a roof of one of a truck and trailer having a loading and unloading area, the diverter comprising:
    a first arm having an upright portion and a base portion, wherein the upright portion is substantially perpendicular to the base portion such that the first arm has a substantially L-shaped cross-section;
    a second arm having an upright portion and a base portion, wherein the upright portion is substantially perpendicular to the base portion such that the second arm has a substantially L-shaped cross-section;
    wherein the first arm is joined to the second arm at a middle of the diverter such that an angle between the first arm and the second arm is from about 90 degrees to about 160 degrees such that ends of the first arm and the second arm sweep towards a rear of one of the truck and trailer;
    wherein the diverter is mountable on the roof of one of the truck and trailer such that distal ends of the first arm and the second arm extend to side edges of the roof of one of the truck and trailer such that water flowing along the roof is directed towards side edges of one of the truck and trailer along the first arm and the second arm and away from the loading unloading area and;
    wherein the diverter is located along the roof of one of the truck and trailer such that the diverter interacts with an air flow along the roof of one of the truck and trailer to enhance air flow over one of the truck and trailer.

11. The diverter for directing water runoff along a roof of one of a truck and trailer having a loading and unloading area of claim 10, further comprising one or more apertures formed through the base portion of the first arm and the base portion of the second arm for receiving one or more fasteners to secure the diverter to the roof.

12. The diverter for directing water runoff along a roof of one of a truck and trailer having a loading and unloading area of claim 10, wherein a thickness of the upright portion of the first arm and a thickness of the upright portion of the second arm is tapered towards upper ends of the upright portion of the first arm and the upright portion of the second arm.

13. The diverter for directing water runoff along a roof of one of a truck and trailer having a loading and unloading area of claim 10, wherein the first arm and the second arm are formed of a single elongate member folded at a center of the single elongate member.

* * * * *